D. C. MATTESON & T. P. WILLIAMSON.

Plows.

No. 5,735. Reissued Jan. 20, 1874.

Witnesses.

John L. Borne

C. Milton Richardson

2nd Truman Paul Williamson

1st Don Carlos Matteson by Dewey & Co

Attys

AM. PHOTO-LITHOGRAPHIC Co. N.Y. (OSBORNE'S PROCESS)

UNITED STATES PATENT OFFICE.

DON CARLOS MATTESON AND TRUMAN P. WILLIAMSON, OF STOCKTON, CAL.

IMPROVEMENT IN PLOWS.

Specification forming part of Letters Patent No. 62,766, dated March 12, 1867; reissue No. 3,179, dated November 3, 1868; reissue No. 5,735, dated January 20, 1874; application filed December 15, 1873.

*To all whom it may concern:*

Be it known that we, DON CARLOS MATTESON and TRUMAN P. WILLIAMSON, of Stockton, in the county of San Joaquin and State of California, have invented certain new and useful Improvements in Plows; and we do hereby declare that the following is a full, clear, and exact description thereof, that will enable others skilled in the art to which it appertains to make and use the same, reference being had to the accompanying drawings and to the letters of reference marked thereon, which form a part of this specification.

Our invention consists in an improved standard for holding the mold-board, which has a peculiar construction, as hereinafter more fully described.

To more fully explain our invention, reference is had to the accompanying drawings, forming a part of this specification, in which—

Figure 1:
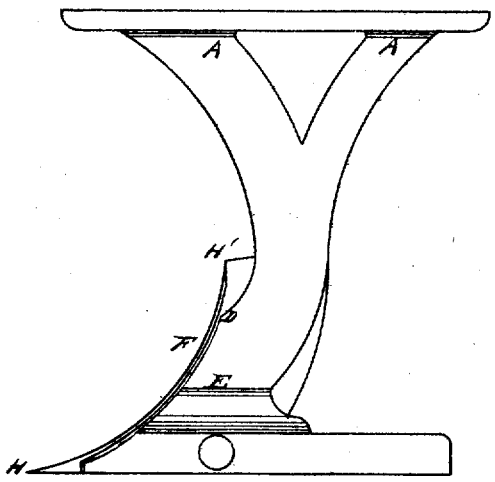
Figure 2:
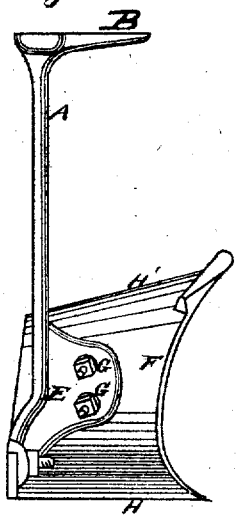
Figure 3:
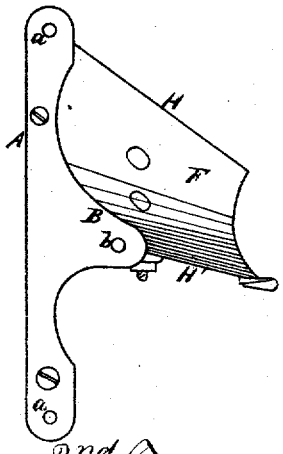

Figure 1 is a side elevation. Fig. 2 is a rear view. Fig. 3 is a top view.

Similar letters of reference indicate corresponding parts.

A is the supporting-standard, which is attached to the beam by bolts passing through the bolt-holes *a a* at each end, and also through the hole *b* in the lug B. The lug B is added as a part of the upper end of the standard A, in order that the hole *b* may be outside of a direct line between the holes *a a*, and thus afford a lever-power to sustain the side strain often thrown upon the plow when in use. By this means we preserve the necessary strength of attachment between the standard and plow-frame, and at the same time get rid of the iron braces that usually extend from the plow-frame to the iron part of the plow below the frame, and often prove a serious detriment in plowing by gathering straw and rubbish, and clogging the plow. This construction makes the fastening very firm, and much smaller bolts may be used than where only the holes *a a* are used. The front edge of the standard, at C, is curved, as shown, so that the forward part is bolted to the beam nearly over the point of the share. This form keeps the weeds and grass from clogging against the beam. An offset is made at the point D of the standard, a little below the upper edge of the mold-board, and another at the point E, so that the mold-board projects a little beyond the standard. These serve to keep the plow from clogging on the land-side. The mold-board F is made with two complete edges, H and H′, and is bolted to the standard by the two bolts G G′ in the center. The curve of the face of the mold-board is regular, and the shape is such that it fits equally well with either edge down. The object of this construction is to allow the mold-board to be reversed, so that when one edge becomes dull, the two bolts can be removed and the other edge used. By constructing the plow in this way greater strength is obtained, the mold-board will always have a sharp edge, and can be easily replaced when necessary, while, as an article of manufacture, it can be afforded much cheaper than those of the ordinary construction.

Having thus described our invention, we claim as new and desire to secure by Letters Patent—

1. The curved standard A, with the lug B and the offsets D and E, substantially as and for the purpose described.

2. A plow-standard constructed with the lug B upon its upper end, as described, so that the hole *b* will be outside of a direct line with the holes *a a*, substantially as and for the purpose set forth.

In testimony that we claim the foregoing, we have hereunto set our hands this 29th day of November, 1873.

DON CARLOS MATTESON.
TRUMAN PANE WILLIAMSON.

Witnesses:
HERBERT E. HALL,
ED. KALISHER.